United States Patent
Orhand et al.

(10) Patent No.: US 9,341,844 B2
(45) Date of Patent: May 17, 2016

(54) DISPLAY METHOD THROUGH A HEAD MOUNTED DEVICE

(71) Applicant: THOMSON LICENSING, Issy de Moulineaux (FR)

(72) Inventors: Anita Orhand, Rennes (FR); Didier Doyen, La Bouexiere (FR); Jean-Francois Vial, Rennes (FR)

(73) Assignee: Thomson Licensing (FR)

( * ) Notice: Subject to any disclaimer, the term of this patent is extended or adjusted under 35 U.S.C. 154(b) by 93 days.

(21) Appl. No.: 14/467,178

(22) Filed: Aug. 25, 2014

(65) Prior Publication Data

US 2015/0054743 A1  Feb. 26, 2015

(30) Foreign Application Priority Data

Aug. 26, 2013 (EP) .................................. 13306172

(51) Int. Cl.
*G06F 3/0346* (2013.01)
*G02B 27/00* (2006.01)
(Continued)

(52) U.S. Cl.
CPC ........ *G02B 27/0093* (2013.01); *G02B 27/0101* (2013.01); *G02B 27/017* (2013.01); *G06F 3/012* (2013.01); *G06F 3/013* (2013.01); *G06F 3/017* (2013.01); *G06F 3/0304* (2013.01); *G06F 3/0488* (2013.01); *G06F 3/167* (2013.01); *G02B 2027/014* (2013.01); *G02B 2027/0138* (2013.01); *G02B 2027/0178* (2013.01);
(Continued)

(58) Field of Classification Search
CPC .......... G02B 27/0093; G02B 27/0101; G02B 27/017; G02B 2027/0138; G02B 2027/0178; G06F 3/012; G06F 3/0304; G06F 3/0488; G06F 3/017; G06F 3/013; G06F 3/167; G06F 2203/0382; G06F 2203/0381
See application file for complete search history.

(56) References Cited

U.S. PATENT DOCUMENTS 5,689,619 A  11/1997 Smyth
8,225,226 B2  7/2012 Skourup et al.
(Continued)

FOREIGN PATENT DOCUMENTS

EP  1607840  12/2005
GB  2465280  5/2010

OTHER PUBLICATIONS

Eunjin Koh et al., "Vision-based Virtual Touch Screen Interface", International Conference on Consumer Electronics, Las Vegas, Nevada, Jan. 9-13, 2008,1-4244,1459-8/08, 2008 IEEE, DOI: 10.1109/ICCE.2008.4587900.
(Continued)

*Primary Examiner* — Ilana Spar
*Assistant Examiner* — Charles Zheng
(74) *Attorney, Agent, or Firm* — Jack Schwartz & Associates, PLLC

(57) ABSTRACT

A method for validating a control operation to be performed by a target device through a virtual control interface. The virtual control interface is displayed by a head mounted device. A selection instruction of a first area is detected, delivering a first area. A position of gaze is detected, delivering a second area within the virtual control interface. It is detected if the first area and the second area are at least partially overlapping a same dedicated area associated to a control operation to be performed by the target device. In case of detection of an occurrence of the first area and the second area at least partially overlapping, the control operation is validated.

18 Claims, 4 Drawing Sheets

(51) Int. Cl.
  *G02B 27/01* (2006.01)
  *G06F 3/16* (2006.01)
  *G06F 3/01* (2006.01)
  *G06F 3/0488* (2013.01)
  *G06F 3/03* (2006.01)

(52) U.S. Cl.
  CPC . *G06F2203/0381* (2013.01); *G06F 2203/0382* (2013.01)

(56) References Cited

U.S. PATENT DOCUMENTS

2003/0020707 A1  1/2003  Kangas et al.
2012/0092300 A1  4/2012  Wang et al.
2012/0257035 A1  10/2012  Larsen
2013/0069985 A1  3/2013  Wong et al.
2013/0169560 A1  7/2013  Cederlund et al.

OTHER PUBLICATIONS

Seok-Han Lee et al, "Design and Implementation of an Interactive HMD for Wearable AR System" 2011 17th Korean-Japan Joint Workshop on Frontiers of Computer Vision (FVC 2011).

Bourke et al: "A High-Perfomance Hardware Speech Recognition System for Mobile Applications"; ECE Dept., Carnegie Mellon Univ.; SRC Techon, publ. Oct. 1, 2005; pp. 1-4.

Search Report Dated Jan. 20, 2014.

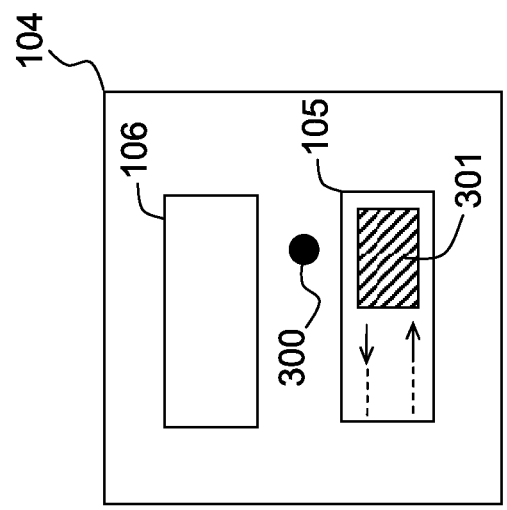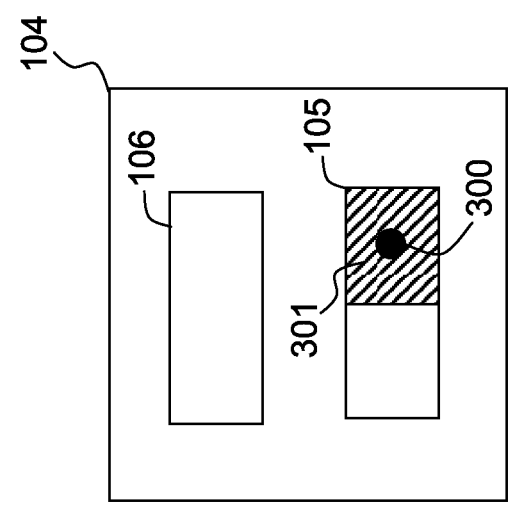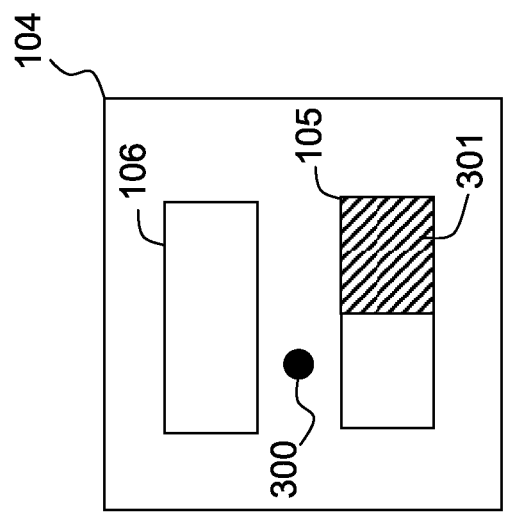

DISPLAY METHOD THROUGH A HEAD MOUNTED DEVICE

This application claims the benefit, under 35 U.S.C. §119 of European Patent Application No. 13306172.1, filed Aug. 26, 2013.

FIELD OF THE DISCLOSURE

The disclosure relates to user's interaction with target devices. More precisely, the disclosure is to be used in the context where a person uses a device named a wearable computer with a head-mounted display (also named as a head display device), such as for example see trough glasses, and interacts with such target devices.

BACKGROUND OF THE DISCLOSURE

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Nowadays, it is possible to control devices by the use of a control user interface displayed by a wearable computer with a head-mounted display. For example, such possibility is depicted in the document US20130069985, especially in the FIGS. 9 and 10 which explain how to open or close a garage door by interacting with a virtual control interface according to a detected movement (see §0048 and §104 of the document US20130069985). Such detected movement can be a head motion, a voice command or any gesture that corresponds to a control instruction associated with the control interface.

Such validation process is just one way among others to interact and control a target device. Indeed, other techniques are disclosed in some documents of the state of the art. More precisely, the technique of the document US20030020707 consists in superposing a view of a virtual object (displayed through a head-mounted see through display (also named a HMD) associated to an action (for example a "read", "stop" commands) to a real object (the target device), in order to generate a control instruction for the real object (or target device).

The technique of the document GB2465280 is based on the detection of a user's finger in order to identify an object of interest to be controlled. Such technique can be assimilated to the one disclosed in the document US20130069985.

The document US20120092300 discloses also a head mounted see through display device that can display a virtual keyboard comprising virtual touch. Here again, when a camera comprised within the head mounted see through display device detects that the finger of a user is positioned as to be on a virtual touch, it activates an action associated to the virtual touch, and the target device performs such action.

However, all these techniques have a common drawback. Indeed, in case of a sudden movement (let's say a bee flies in front of you, and you want to make it leaves by a sudden movement with your hand), you could validate a control operation associated with such a movement on a displayed interface without having the purpose to do it. The disclosure aims to solve such issue.

In order to solve such issue, one skilled in the art, starting from the teachings of the document US20130069985, considered as the closest prior art, and trying to prevent the occurrence of an undesired validation, would have used a double validation technique (e.g. a kind of double-click) consisting in performing at least two times a same movement (or gesture), or a same voice command.

SUMMARY OF THE DISCLOSURE

The present disclosure is directed to a method for validating a control operation to be performed by a target device through a virtual control interface, such virtual control interface being displayed by a head mounted device of a user. Such method is remarkable in that it comprises:
- a step of detecting a selection instruction of a first area within said virtual control interface delivering a selected first area;
- a step of detecting a position of gaze of said user, delivering a second area within said virtual control interface;
- a step of detecting if said selected first area and said second area are at least partially overlapping a same dedicated area associated to a control operation to be performed by said target device; and in case of detection of an occurrence of said at least partially overlapping, said method further comprising a step of validating said control operation. Hence, such method can enable to ensure that the user wants to perform a particular control operation. Indeed, with such method, a non-intentional validation of a control operation has a very low probability to occur. Therefore, such method provides a technique to guarantee the intentionality of the user.

In a preferred embodiment, such method for validating is remarkable in that said selection instruction of a first area corresponds to a position of a gesture of said user.

In a preferred embodiment, such gesture is associated to a part of a body of said user.

In a preferred embodiment, such method for validating is remarkable in that said selection instruction of a first area corresponds to a voice command of said user, and said first area is comprised in said dedicated area.

In a preferred embodiment, said first area corresponds to said dedicated area.

In a preferred embodiment, such method for validating is remarkable in that it comprises a step of displaying said virtual control interface in case of detection of a target device by a sensor.

In a preferred embodiment, said sensor is comprised in said head mounted device.

In a preferred embodiment, said sensor is comprised in a wrist watch wear by said user.

Therefore, the user doesn't have to look at the target device directly for that the virtual control interface appears. The wrist watch has just to be pointed in direction to the target device. It provides more movement freedom to the user.

In a preferred embodiment, the method for validating is remarkable in that said sensor is a camera.

In a preferred embodiment, the method for validating is remarkable in that said step of detecting detects if said selected first area and said second area are completely overlapping said same dedicated area, and in that said step of validation is executed only if said selected first area and said second area are completely overlapping said same dedicated area.

In a preferred embodiment, the method for validating is remarkable in that execution of said step of validation is also conditioned by a detection of an overlapping of said selected first area and said second area.

In another embodiment of the disclosure, it is proposed a head mounted device comprising means for displaying a virtual control interface associated to a target device. Such head mounted device is remarkable in that it comprises:

means for detecting a selection instruction of a first area within said virtual control interface delivering a selected first area;

means for detecting a position of gaze of a user of said head mounted device, delivering a second area within said virtual control interface;

means for detecting if said selected first area and said second area are at least partially overlapping a same dedicated area associated to a control operation to be performed by said target device; and in case of detection of an occurrence of said at least partially overlapping, said head mounted device further comprising means for validating said control operation that are activated.

In a preferred embodiment, such head mounted device is remarkable in that said selection instruction of a first area corresponds to a position of a gesture of said user.

In a preferred embodiment, such head mounted device is remarkable in that said selection instruction of a first area corresponds to a voice command of said user, and said first area is comprised in said dedicated area.

In a preferred embodiment, such head mounted device is remarkable in that said first area corresponds to said dedicated area.

BRIEF DESCRIPTION OF THE FIGURES

The above and other aspects of the disclosure will become more apparent by the following detailed description of exemplary embodiments thereof with reference to the attached drawings in which:

FIGS. 3(a)-(c) detail other scenario of validation according to other embodiments of the disclosure;

DETAILED DESCRIPTION

Figure 1:
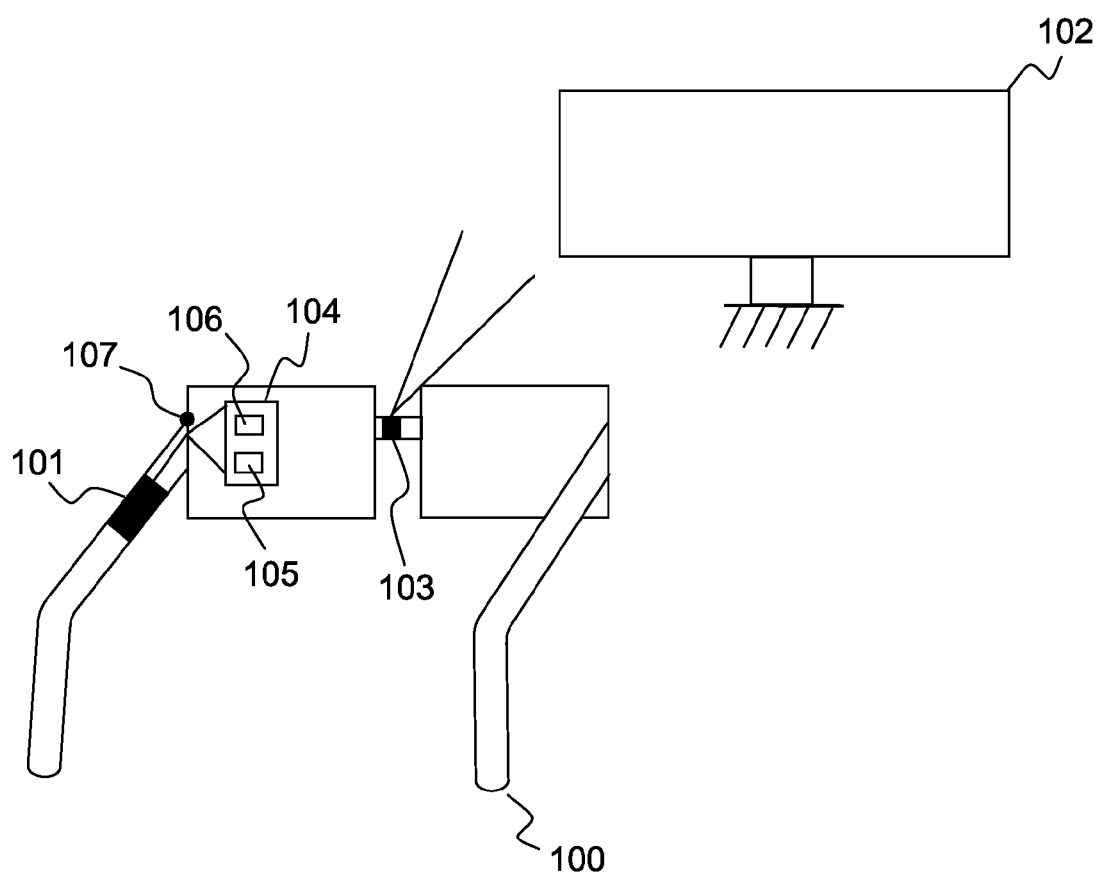
FIG. 1 presents a head mounted device according to one embodiment of the disclosure.

FIG. 1 presents a head mounted device according to one embodiment of the disclosure.

More precisely, in such embodiment, an head mounted device, referenced 100, comprises two glasses, and an electronic device, referenced 101, (an example of such device is detailed in the FIG. 4), that can generate or handle a signal to be displayed to a user, a sensor referenced 103 that can detect a target device for which an action is to be done, and another sensor referenced 107, that can detect the gaze of the user wearing such head mounted device. In one embodiment, the displayed signal is directly projected in the retina of the user. In another embodiment, the displayed signal is projected within one of the two glasses. Such signal to be displayed can represent a virtual control interface, referenced 104, that enables to control a target device, as for example a TV set, referenced 102.

When the user moves his head in the direction of the TV set, the sensor 103 detects (for example by a recognition technique) the presence of a TV set. In that case, according to the nature of the detected target device, a dedicated/personalized virtual control interface is displayed through the head mounted device 100. In one embodiment, some parameters of personalization of the virtual control interface can be stored in a memory unit comprised in the electronic device 101.

The displayed virtual control interface 104 (either generic or personalized) comprises some dedicated areas (such as some boxes or touches, referenced 105 or 106) that are associated to control operations that can be performed by the target device 102. More precisely, each dedicated area represents a geometric form with, for example, a text (or a color) comprised in such dedicated area. Hence, the user is able to know that such dedicated area, if selected, is going to launch a corresponding control operation. For example, when a user is in front of a garage door (i.e. a target device), if a QR (for Quick Response) code or matrix barcode is detected by the sensor 103 positioned near the garage door (for example on a wall on a side of the garage door), a virtual control interface 104 dedicated to the control of such garage door is displayed via the head mounted device 100. In that case, two dedicated areas can be displayed: the first one 105 comprises the following text inside: "open the garage door", and the second one 106 comprises the following text inside: "close the garage door". If the user validates the selection of one of the two dedicated area (or box), the corresponding action (or the control operation) is sent to an electronic device that can interpret it, and then it activates a motor that controls the movement of the garage door.

Hence, the user who wants to validate a control operation has to provide, in a first step, a selection instruction that defines a first area within the virtual interface 104. Such selection instruction can be for example a voice command such as "start", "stop", etc. (in that case, the electronic device comprises means for recognizing audio content). In that case, the user can just read the text comprised in the dedicated area in the virtual control interface, in order to select it. In another embodiment, such selection instruction can be a position/area of a gesture (such as the position of a finger of the hand), a combination of gestures, etc. Such selection instruction is detected by the sensor 103 and the electronic device 101 determines later if it corresponds to a position that may at least partially overlap the displayed dedicated areas in the virtual control interface. Then, in a second step, concomitant to said first step, position of a gaze of the user is detected via the sensor 107, in order to determine if a dedicated area (or box) 106 or 105 in the virtual interface 104 is looked at by the user. In case of overlapping of the areas (i.e. the overlapping (partially or completely) of the first area, obtained by the detection of the selection instruction, with the dedicated area, and the overlapping (partially or completely) of the second area, obtained by the detection of the position of gaze of the user, with the same dedicated area), a validation of the associated command is performed.

For instance, if the user wants to close the garage door via the validation of the control command which is associated to box 106, he pronounces the following sentence: "close the garage door", and in order to have this control command validated, the gaze of the user is also checked. If it overlaps (partially or completely) the area 106, then the control command will be activated, otherwise it won't.

The head mounted device 100 transmits, through communication means (not represented) the command/operation to be executed by the target device 102. Such communication means comprise an antenna that allows the reception and transmission of signals between the head mounted device and a target device. In one embodiment, such antenna is an NFC compliant antenna, or a RFID compliant antenna. In another embodiment, such communication means comprise a Bluetooth compliant unit.

When a target device is a TV set, the control operation can be an operation belonging to the group comprising: on/off operation, record operation, zoom in/out operation, brightness control operation, sound control operation, change channel operation, etc.

In another embodiment, the sensor 103 is not comprised in the head mounted device 100, but within a wrist watch (not represented) comprising also communication means in order to cooperate with a head mounted device.

In another embodiment, both a wrist watch and the head mounted device comprise a sensor 103.

The sensor 107 can be an eye-tracking unit connected to the electronic device 101. In another embodiment, a part of the processing of the electronic device 101 can be delegated to a central unit (that covers a physical area comprising several devices that can be controlled through the use of a head mounted device).

Figure 2C:
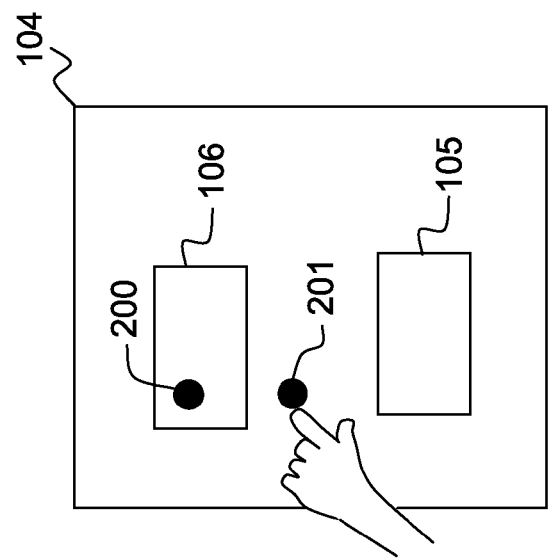
FIGS. 2(a)-(c) present different scenario that detail how the validation according to one embodiment of the disclosure is done.
Figure 2B:
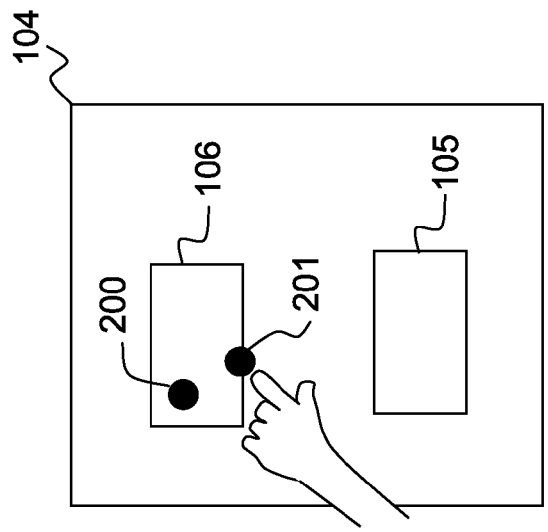
Figure 2A:
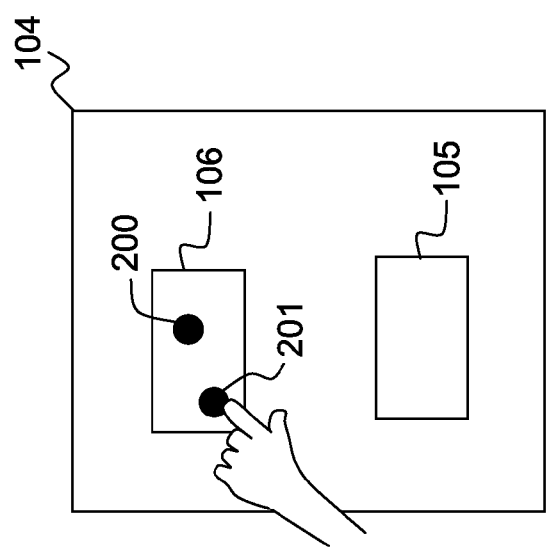

FIGS. 2(a)-(c) present different scenario that detail how the validation according to one embodiment of the disclosure is done.

In the FIGS. 2(a)-(c), the user sees through the head mounted device 100, the virtual control interface 104 comprising two dedicated areas (or boxes) 105 and 106. Obviously, in another embodiment, the number of dedicated areas (each dedicated area being associated to a control operation) can be smaller or higher than two.

In FIG. 2(a), the gaze attention of the user, detected by the sensor 107, defines a first area, referenced 200, and represented by a circle (in another embodiment, the first area is represented by another shape such as a square, a rectangle, etc.).

The sensor 103 detects the position of a finger that defines a second area, referenced 201, and represented by a circle (in another embodiment, the first area is represented by another shape such as a square, a rectangle, etc.).

Such representations can be displayed or not through the head mounted device 100. In one embodiment, these representations are only used by the electronic device 101, and are therefore not displayed. Such representation defines the scope of precision of the method of validation. The narrower they are, the sharper precision you obtain. For example, the smaller the size of the diameter of a circle 200 or 201 is, the more accurate the validation is. Such size can be function of the importance of the control operation. For example, if the execution of a control operation can have important consequences, the size should be small in order to reduce the probability of occurrence of a wrong validation.

In one embodiment, the first area 200 or 201 detected in one of the dedicated area 105 or 106 selects the control operation. Then when a second area 200 or 201 overlaps (partially or completely) with the dedicated area, it means that the selected control operation can be executed by the target device. In that case, the head mounted device transmits such command instruction to the target device.

The FIG. 2(a) presents an example of validation of the control command associated to the box/dedicated area 106. Indeed, areas 200 and 201 are detected as being comprised in the dedicated are/box 106.

The FIG. 2(b) presents an example of validation of the control command associated to the box/dedicated area 106. Indeed, areas 200 and 201 are detected as being comprised in the dedicated are/box 106 (even if only a part of the area 201 is comprised in the dedicated area 106).

The FIG. 2(c) presents an example of non-validation of the control command associated to the box/dedicated area 106.

Indeed, the area 201 is not detected as being comprised in the dedicated are/box 106. The area does not overlap the dedicated area 106.

In another embodiment (not represented by FIGS. 2(a)-(c)), the validation of the command associated to a dedicated area is performed only if the first area 200 and the second area 201 touch each other in the referenced area 106. In another embodiment, when a user does not use a finger or a gesture, but uses his voice to define a first area, such selected first area corresponds to the whole dedicated area 105 or 106. In another embodiment, it could be only a part of said dedicated area. These embodiments are more detailed in the following.

FIGS. 3(a)-(c) detail other validation scenario according to other embodiments of the disclosure.

The FIGS. 3(a)-(c) illustrate the case where a user wants to open the garage door. In this embodiment, the user reads loudly a text that is displayed for example in the area 105 (i.e. the following text: "open the garage door"), and means for recognizing audio content (comprised in the electronic device 101 for example) detect if what the user tells corresponds to one of the displayed text. If means for recognizing audio content detects that the user has said "open the garage door", a part of the area 105 is selected (represented by the area comprising stripes, referenced 301). Then, the gaze attention of the user, detected by the sensor 107, defines the area, referenced 300, represented by a circle (as the area 200 in FIGS. 2(a)-(c)). In the FIG. 3(a), the validation of the command "open the garage door" is not performed due to the fact that the area 301 and 300 do not overlap. Whereas, the FIG. 3(b) presents the validation of the command (or control operation) "open the garage door" due to the fact that the area 301 and 300 overlap. In that case, the head mounted device 100 transmits the command in order to execute the intended action (e.g. the opening of the garage door).

At last, the FIG. 3(c) depicts another embodiment in which, when the user reads loudly a text that is displayed for example in the area 105 (i.e. the following text: "open the garage door"), and that text is recognized by means for recognizing audio content, a part of the area 105 is selected (the area referenced 301) and such part 301 is moving inside the area 105 (in another embodiment, such moving area 301 can even go beyond the limitation of the area 105, but without overlapping with the area 106). Then, the area 300, defined according to the gaze attention of the user, has to be overlapped with the area 301 in order to validate the transmission of a command. As the area 301 is moving, such validation technique prevents the occurring of an unintentional validation.

Figure 4:
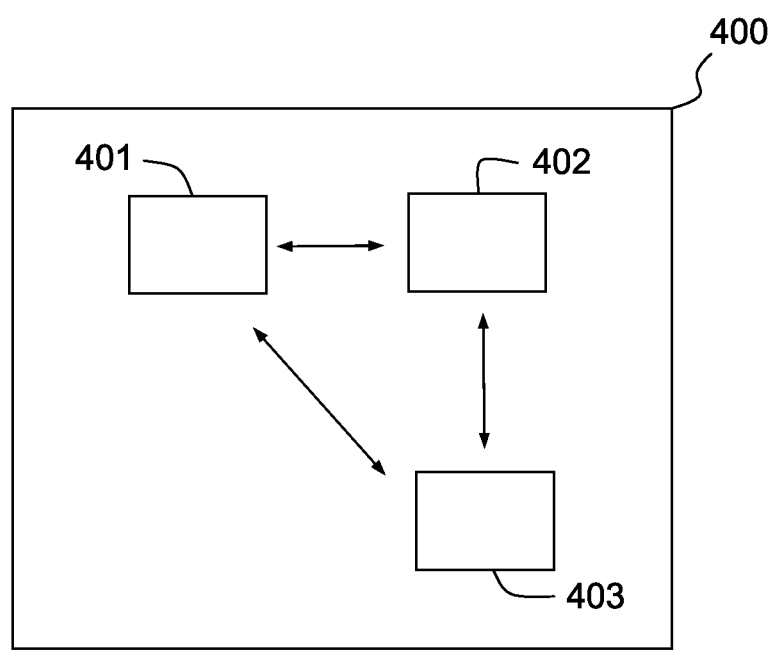
FIG. 4 presents a device that can be used to perform one or several steps of the methods disclosed in the present document.

FIG. 4 presents an electronic device that can be used to perform one or several steps of the methods disclosed in the present document.

Such device referenced 400 comprises a computing unit (for example a CPU, for "Central Processing Unit"), referenced 401, and one or several memory units (for example a RAM (for "Random Access Memory") block in which intermediate results can be stored temporarily during the execution of instructions a computer program, or a ROM ("Read Only Memory") block in which, among other things, computer programs are stored, or an EEPROM ("Electrically-Erasable Programmable Read-Only Memory") block, or a flash block) referenced 402. Computer programs are made of instructions that can be executed by the computing unit. Such device 400 can also comprise a dedicated unit, referenced 403, constituting an input-output interface to allow the device 400 to communicate with other devices. In particular, this dedicated unit 403 can be connected with an antenna (in order to perform communication without contacts), or with serial ports (to carry communications with contacts). Let's remark that the arrows in FIG. 4 mean that the linked units can exchange data through buses for example together.

In an alternative embodiment, some or all of the steps of the method previously described, can be implemented in hardware in a programmable FPGA ("Field Programmable Gate Array") component or ASIC ("Application-Specific Integrated Circuit") component.

In an alternative embodiment, some or all of the steps of the method previously described, can be executed on an electronic device comprising memory units and processing units as the one disclosed in the FIG. 4.

In one embodiment, such electronic device 400 comprises means for recognizing audio content, as for example the means described in the article: "A High-Performance Hardware Speech Recognition System for Mobile Applications" by P. Bourke et al.

The invention claimed is:

1. A method for validating a control operation to be performed by a target device through a virtual control interface, said virtual control interface being displayed by a device, the method comprising:
   detecting, by a first sensor, a selection instruction of corresponding to a first area within said virtual control interface;
   detecting, by a second sensor, a position of gaze corresponding to a second area within said virtual control interface;
   detecting if said first area and said second area are at least partially overlapping within a same dedicated area of said virtual control interface associated to a control operation to be performed by said target device; and
   in case of detection of an occurrence of said first area and said second area at least partially overlapping, validating said control operation.

2. The method for validating according to claim 1, wherein said selection instruction of said first area corresponds to a position of a gesture.

3. The method for validating according to claim 2, wherein said gesture is associated to a part of a body.

4. The method for validating according to claim 1, wherein said selection instruction of said first area is a voice command corresponding to a command within said dedicated area.

5. The method for validating according to claim 1, further comprising displaying said virtual control interface upon detecting said target device by a third sensor.

6. The method for validating according to claim 5, wherein said third sensor is comprised in a head mounted device.

7. The method for validating according to claim 5, wherein said sensor is comprised in a wrist watch.

8. The method for validating according to claim 5, wherein said third sensor is a camera.

9. The method for validating according to claim 1, wherein detecting if said first area and said second area are at least partially overlapping detects if said first area and said second area are completely overlapping said same dedicated area, and validation is executed only if said first area and said second area are completely overlapping said same dedicated area.

10. The method for validating according to claim 1, wherein validation is also conditioned by detection of an overlapping of said first area and said second area.

11. A device comprising
   a lens for displaying a virtual control interface associated to a target device;
   a first sensor for detecting a selection instruction corresponding to a first area within said virtual control interface;
   a second sensor for detecting a position of gaze corresponding to a second area within said virtual control interface; and
   an electronic device for detecting if said first area and said second area are at least partially overlapping within a same dedicated area of said virtual control interface associated to a control operation to be performed by said target device; and activating, upon detection of an occurrence of said first and second areas at least partially overlapping within said same dedicated area, said control operation to be performed by said target device.

12. The device according to claim 11, wherein said selection instruction of said first area corresponds to a position of a gesture.

13. The device according to claim 11, wherein said selection instruction of said first area is a voice command corresponding to a commend within said dedicated area.

14. The device according to claim 11, further comprising a third sensor and said virtual control interface is displayed on said lens upon detecting said target device by said third sensor.

15. The device according to claim 14, wherein said device is a head mounted device and said third sensor is positioned within a wrist watch, said third sensor communicating with said electronic device.

16. The device according to claim 14, wherein said third sensor is a camera.

17. The device according to claim 11, wherein said electronic device detects if said first area and said second area are completely overlapping within said same dedicated area, and activates said control operation only if said first area and said second area are completely overlapping within said same dedicated area.

18. The device according to claim 11, wherein activation is also conditioned by detection of an overlapping of said first area and said second area.

* * * * *